United States Patent [19]

Takagi et al.

[11] Patent Number: 5,026,787
[45] Date of Patent: Jun. 25, 1991

[54] IMPACT RESISTANT THERMOPLASTIC RESIN COMPOSITION

[75] Inventors: Kiyoji Takagi; Koji Nishida, both of Yokkaichi, Japan

[73] Assignee: Mitsubishi Petrochemical Co., Ltd., Tokyo, Japan

[21] Appl. No.: 466,640

[22] Filed: Jan. 17, 1990

[30] Foreign Application Priority Data

Jan. 31, 1989 [JP] Japan ................................. 1-19664

[51] Int. Cl.$^5$ ...................... C08L 71/12; C08L 77/00; C08L 51/04; C08L 53/02
[52] U.S. Cl. ....................................... 525/391; 525/66; 525/92; 525/397; 525/905
[58] Field of Search ................. 525/391, 397, 905, 92, 525/66

[56] References Cited

U.S. PATENT DOCUMENTS 4,839,425 6/1989 Mawatari et al. .................. 525/183

Primary Examiner—John C. Bleutge
Assistant Examiner—Thomas Hamilton, III
Attorney, Agent, or Firm—Frishauf, Holtz, Goodman & Woodward

[57] ABSTRACT

A composition comprising a polyphenylene ether, a polyamide resin and a compound having an unsaturated group and a polar group in combination in the same molecule kneaded therein, and optionally an impact resistance improving material kneaded in said kneaded product. Impact resistance can be greatly improved as compared with the composition having the all components kneaded at the same time.

8 Claims, No Drawings

IMPACT RESISTANT THERMOPLASTIC RESIN COMPOSITION

BACKGROUND OF THE INVENTION

This invention relates to a resin composition, more particularly to a thermoplastic resin composition having excellent low temperature impact resistance and dimensional stability as well as good appearance and luster.

Polyphenylene ether resins are attracting attention as useful resins having excellent mechanical properties and heat resistance, and have been used as blended with styrenic resins, but they are remarkably poor in solvent resistance. For improving this point, blends with polyamides (U.S. Pat. No. 4,338,421) or polyesters (Japanese Patent Publication No. 21662/1976) have been proposed.

Further, for the purpose of improving impact strength of these blends, compositions comprising a compound containing a polar group such as carboxyl group, imide group and epoxy group, and a rubbery material added to the combination of a polyphenylene ether and a polyamide (U.S. Pat. No. 4,315,086) have been proposed.

In recent years, such polyphenylene ether resin composition materials having characteristics excellent in impact resistance, solvent resistance, heat resistance, moldability and dimensional stability are going to be utilized as automobile external plate materials such as fender and door panel, and further improvement of impact resistance has been demanded. Particularly, in such uses, high speed impact at low temperature must be ductile destruction.

Accordingly, molded products comprising a polyamide resin, a compound containing a polar group such as carboxyl group, imide group and epoxy group, and an impact resistance improving material comprehensively blended therein have been developed.

However, such molded products can satisfy high speed impact by formulation of much amount of an impact resistance improving material, but on the other hand have the drawback that lowering in rigidity, heat resistance or dimensional stability is great.

SUMMARY OF THE INVENTION

Accordingly, an object of the present invention is to overcome the drawback possessed by the above molded product and provide a resin molded product excellent in low temperature impact resistance and dimensional stability, and improved in appearance and luster.

The present inventors have investigated intensively in order to accomplish the above object, and consequently found that a resin composition comprising a polyamide resin and an impact resistance improving material formulated in a resin composition comprising a polyphenylene ether resin composition, a polyamide resin and a compound having an unsaturated group and a polar group in combination which has been previously blended is a composition excellent in balance of physical properties of low temperature and high speed resistance and rigidity, and also good in appearance and luster, to accomplish the present invention.

More specifically, the resin composition of the present invention comprises:

(A) 10 to 70% by weight of an intermediate composition obtained by melting and kneading:
  (A₁) 75 to 99% by weight of a polyphenylene ether resin;
  (A₂) 0.1 to 19.9% by weight of a polyamide resin;
  (A₃) 0.01 to 10% by weight of a compound having an unsaturated group and a polar group in the same molecule in combination,
  (A₄) 0 to 20% by weight of an impact resistance improving material,
(B) 30 to 90% by weight of a polyamide resin, and
(C) 0 to 35% by weight of an impact resistance improving material kneaded therein.

DESCRIPTION OF THE PREFERRED EMBODIMENTS

First, the intermediate composition (A) obtained by melting and kneading the above COmpOnents (A₁), (A₂) and (A₃) is described.

In (A), the component (A₁) is a polyphenylene ether resin, and this has a recurring structural unit represented by the following formula:

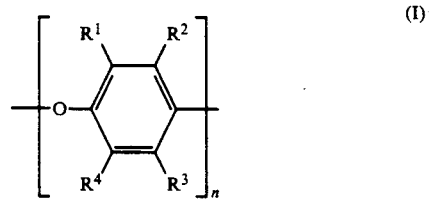

wherein the ethereal oxygen atom of one unit is connected to the benzene nucleus of the next adjoining unit, n is at least 50, $R^1$, $R^2$, $R^3$ and $R^4$ each independently represent a monovalent substituent selected from the group consisting of hydrogen atom, a halogen atom, a hydrocarbon group containing no tertiary α-carbon atom, halo-hydrocarbon groups having at least 2 carbon atoms between halogen atom and benzene nucleus, a hydrocarbonoxy group and a halohydrocarbonoxy group having at least two carbon atoms between halogen atom and benzene nucleus.

In the above formula (I), the hydrocarbon group containing no tertiary α-carbon atom may include, for example, lower alkyl groups such as methyl, ethyl, propyl, isopropyl and butyl groups; alkenyl groups such as vinyl, allyl, butenyl and cyclobutenyl groups; aryl groups such as phenyl, tolyl, xylenyl and 2,4,6-trimethylphenyl groups; aralkyl groups such as benzyl, phenylethyl and phenylpropyl groups. As the halohydrocarbon group having at least two carbon atoms between halogen atom and benzene nucleus, there may be included, for example, 2-chloroethyl, 2-bromoethyl, 2-fluoroethyl, 2,2-dichloroethyl, 2- and 3-bromopropyl, 2,2-difluoro-3-iodopropyl, 2-, 3-, 4-, 5-fluoroamyl, 2-chlorovinyl, chloroethylphenyl, ethylchlorophenyl, fluoroxylyl, chloronaphthyl and bromobenzyl groups.

Examples of hydrocarbonoxy groups may include methoxy, ethoxy, propoxy, butoxy, phenoxy, ethylphenoxy, naphthoxy, methylnaphthoxy, benzoxy, phenylethoxy and triethoxy groups, and examples of halohydrocarbonoxy groups having at least two carbon atoms between halogen atom and benzene nucleus may include 2-chloroethoxy, 2-bromoethoxy, 2-fluoroethoxy, 2,2-dibromoethoxy, 2- and 3-bromopropoxy, chloroethylphenoxy, ethylchlorophenoxy, iodosiloxy, chloronaphthoxy, bromobenzoxy and chlorotriethoxy groups.

Also, as the polymer having the structural unit of the above formula (I), copolymers such as copolymers of 2,6-dimethylphenol and 2,3,6-trimethylphenol, copolymers of 2,6-dimethylphenol and 2,3,5,6-tetramethylphenol, and copolymers of 2,6-diethylphenol and 2,3,6-trimethylphenol can be included.

Further, the polyphenylene ether to be used in the present invention also includes modified polyphenylene ethers having styrenic monomers (e.g. styrene, p-methylstyrene, α-methylstyrene) grafted onto polyphenylene ethers defined by the above formula (I).

The methods for preparing the polyphenylene ethers corresponding to the above description are known and disclosed in, for example, U.S. Pat. Nos. 3,306,874, No. 3,306,875, No. 3,257,357 and No. 3,257,358, and Japanese Patent Publication No. 17880/1977 and Japanese Provisional Patent Publication No. 51197/1975.

Preferred groups of polyphenylene ethers for the object of the present invention are those having alkyl substituents at the two ortho positions relative to the ethereal oxygen atom and copolymers of 2,6-dialkylphenol and 2,3,6-trialkylphenol.

The polyphenylene ether resin to be used in the present invention preferably has an inherent viscosity of 0.35 to 0.70 dl/g (measured at 30° C. in chloroform).

Next, the polyamide resin of the component ($A_2$) in (A) has

bonds in the polymer main chain, which can be melted by heating. Representative of such polyamide resin are nylon-4, nylon-6, nylon-6,6, nylon-4,6, nylon-12 and nylon-6,10, and otherwise known low crystalline or amorphous polyamides or transparent nylons containing such monomeric components as aromatic diamines and aromatic dicarboxylic acids can be also used.

Preferred polyamide resins ($A_2$) to be used in the present invention are nylon-6,6, nylon-6 and amorphous polyamides, and among them amorphous polyamides are particularly preferred.

The polyamide resin ($A_2$) to be used in the present invention is preferably one having a relative viscosity of 2.0 to 8.0 (measured at 25° C. in 98% conc. sulfuric acid).

Next, as the component ($A_3$) in (A), the compound having an unsaturated group and a polar group in combination in the same molecule is a compound having an unsaturated group, namely a carbon-carbon double bond or a carbon-carbon triple bond and a polar group, namely a functional group exhibiting affinity for or chemical reactivity with the amide bond contained in the polyamide resin, and carboxyl group and amino group existing at the chain terminal, in combination. As such functional group, carboxylic groups of carboxylic acids, groups derived from carboxylic acids, namely carboxyl groups of which hydrogen atom or hydroxyl group is substituted such as various salts or esters, acid amides, acid anhydrides, imides, acid azides, acid halides, or oxazoline, nitrile, epoxy group, amino group, hydroxyl group, or isocyanic acid ester, etc. may be included. As the compound having an unsaturated group and a polar group, unsaturated carboxylic acids, unsaturated esters, unsaturated acid anhydrides, unsaturated epoxy compounds, unsaturated alcohols, unsaturated amines, unsaturated amides and unsaturated isocyanic acid esters may be primarily used.

Specifically, there may be included maleic anhydride, maleic acid, fumaric acid, maleimide, maleic acid hydrazide, reaction products of maleic anhydride and a diamine, for example, those having the structure shown by the following formula:

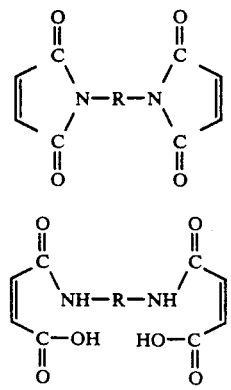

wherein R represents an aliphatic group or an aromatic group, methylnadic anhydride, dichloromaleic anhydride, maleic acid amide, itaconic acid, itaconic anhydride, natural oils and fats such as soybean oil, tung oil, castor oil, linseed oil, hempseed oil, cottonseed oil, sesame oil, rapeseed oil, peanut oil, camelia oil, olive oil, coconut oil and sardine oil, epoxidized natural oils and fats such as epoxidized soybean oil, unsaturated carboxylic acids such as acrylic acid, butenic acid, crotonic acid, vinyl acetic acid, methacrylic acid, pentenic acid, angelic acid, tiburic acid, 2-pentenic acid, 3-pentenic acid, α-ethylacrylic acid, β-methylcrotonic acid, 4-pentenic acid, 2-hexenic acid, 2-methyl-2-pentenic acid, 3-methyl-2-pentenic acid, α-ethylcrotonic acid, 2,2-dimethyl-3-butenic acid, 2-heptenic acid, 2-octenic acid, 4-decenic acid, 9-undecenic acid, 10-undecenic acid, 4-dodecenic acid, 5-dodecenic acid, 4-tetradecenic acid, 9-tetradecenic acid, 9-hexadecenic acid, 2-octadecenic acid, 9-octacedenic acid, eicosenic acid, docosenic acid, erucaic acid, tetracosenic acid, micolibenic acid, 2,4-pentadienic acid, 2,4-hexadienic acid, diallylacetic acid, geranium acid, 2,4-decadienic acid, 2,4-dodecadienic acid, 9,12-hexadecadienic acid, 9,12-octadecadienic acid, hexadecatrienic acid, linoleic acid, linolenic acid, octadecatrienic acid, eicosadienic acid, eicosatrienic acid, eicosatetraenic acid, ricinoleic acid, eleostearic acid, oleic acid, eicosapentaenic acid, erucic acid, docosadienic acid, docosatrienic acid, docosatetraenic acid, docosapentaenic acid, tetracosenic acid, hexacosenic acid, hexacodienic acid, octacosenic acid and traacontenic acid, or esters, acid amides or anhydrides of these unsaturated carboxylic acids, or unsaturated alcohols such as allyl alcohol, crotyl alcohol, methylvinyl carbinol, allyl carbinol, methylpropenyl carbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by $C_nH_{2n-5}OH$, $C_nH_{2n-7}OH$, $C_nH_{2n-9}OH$ (where n is a positive integer), 3-buten-1,2-diol, 2,5-dimethyl-3-hexen-2,5-diol and 1,5-hexadien-3,4-diol, 2,6-octadien-4,5-diol, or unsaturated diamines with OH group of such unsaturated alcohols substituted with $NH_2$ group, or low molecular weight (e.g. average molecular weight of about 500 to 10,000) or high molecular weight (e.g.

number average molecular weight of 10,000 or more) polymers of butadiene and isoprene, having maleic anhydride, phenols added thereto, or having amino groups, carboxyl groups, hydroxyl groups or epoxy groups introduced therein, allyl isocyanate, etc.

In the definition of the compound having an unsaturated group and a polar group in combination, compounds having two or more unsaturated groups, two or more (same or different) polar groups are also included, as a matter of course, and also two or more compounds can be used as the component ($A_3$). Among these, more preferable are unsaturated dicarboxylic acids and anhydrides thereof such as maleic anhydride, maleic acid, itaconic anhydride and itaconic acid, unsaturated alcohols such as oleyl alcohol, epoxidized natural oils and fats, further preferably maleic anhydride, maleic acid, oleyl alcohol, epoxidized soybean oil and epoxidized linseed oil, above all preferably maleic anhydride and mixtures of maleic anhydride and maleic acid.

The components ($A_1$), ($A_2$) and ($A_3$) as described above are formulated in the following proportions based on 100% by weight of the intermediate composition (A).

That is, the formulation ratios of the respective components are 75 to 99% by weight, preferably 77 to 97% by weight, particularly preferably 80 to 96% by weight for the component ($A_1$), 0.1 to 19.9% by weight, preferably 0.5 to 19% by weight, particularly preferably 1.5 to 17% by weight, for the component ($A_2$) and 0.01 to 10% by weight, preferably 0.05 to 5% by weight, particularly preferably 0.2 to 2% by weight, for the component ($A_3$).

If the component ($A_1$) is less than 75% by weight, heat-resistant rigidity and low temperature high speed impact strength are unsatisfactory, while if it exceeds 99% by weight, low temperature high speed impact strength becomes unsatisfactory. Also, if the component ($A_2$) is less than 0.1% by weight, low temperature high speed impact strength of the final composition is unsatisfactory, while if it exceeds 19.9% by weight, heat-resistant rigidity and low temperature high speed impact strength become unsatisfactory. Further, if the component ($A_3$) is less than 0.01% by weight, low temperature impact strength of the final composition is deficient, while if it exceeds 10% by weight, a drawback will occur in appearance of the molded product of the final composition.

In the intermediate composition (A), in addition to the essential components ($A_1$), ($A_2$) and ($A_3$) as described above, an impact resistance improving material ($A_4$) can be added.

As the impact resistance improving material, the same material as the impact resistance improving material of the component (C) as described later can be used.

The amount of the impact resistance improving material ($A_4$) added may be 0 to 20% by weight, preferably 1 to 18% by weight, more preferably 2 to 15% by weight, based on the intermediate composition (A).

Also, the intermediate composition (A) can use optional component such as various stabilizers, flowability controllers, heat-resistant improving fillers (e.g. granular inorganic fillers of 1 $\mu$m or less) and heat-resistant rigidity improving fillers (e.g. needle-shaped or fibrous fillers with aspect ratio of 5 or more), added within the range which does not impair remarkably the effect of the present invention.

The intermediate composition (A) can be obtained by melting and kneading the components as described above formulated to predetermined proportions.

First, all of the respective components are mixed by Henschel mixer, super mixer, ribbon blender or V blender to prepare a dispersed mixture.

Next, the mixture is melted and kneaded by use of a single-screw or twin-screw type extruder with L/D=10 to 30, whereby the composition can be obtained.

Also, the polyphenylene ether resin ($A_1$) and the compound having an unsaturated group and a polar group in combination within the same molecule ($A_3$) may be first kneaded, followed by addition of the polyamide resin ($A_2$).

The melting and kneading temperature is generally within the range from 200° to 350° C.

The intermediate composition (A) can be used under the molten state as such, or as the product pelletized, or further as the powdered and dried product thereof, for preparation of the final composition.

In the resin composition of the present invention, as the polyamide resin to be used as the component (B), the polyamides as mentioned in the component ($A_2$) in the intermediate composition (A) can be used.

In the resin composition of the present invention, the intermediate composition (A) as described above and the polyamide (B) is formulated as described below.

That is, (A) is 10 to 70% by weight, preferably 12 to 65% by weight, particularly preferably 15 to 60% by weight, and (B) is 30 to 90% by weight, preferably 32 to 67% by weight, particularly preferably 35 to 60% by weight.

In the resin composition of the present invention, if (A) is less than 10% by weight, heat-resistant rigidity is unsatisfactory, while if it exceeds 70% by weight, organic solvent resistance and low temperature high speed impact resistance are deficient. On the other hand, if (B) is less than 30% by weight, organic solvent resistance is unsatisfactory, while if it exceeds 90% by weight, heat-resistant rigidity becomes unsatisfactory.

In the resin composition of the present invention, it is desired to add an impact resistance improving material (C).

As the impact material improving material (C), an elastomer may be used.

If these elastomers have too high tensile modulus, they are insufficient as impact resistance improving material, and therefore the tensile modulus of elastomer should be preferably 5000 Kg/cm$^2$ (measured according to ASTM-D-882) or less, more preferably 3500 Kg/cm$^2$ or less.

As the elastomer to be used in the present invention, there may be included natural rubber and polymerized diene rubbers such as polybutadiene, polyisoprene and copolymers of such diene and vinyl monomers, for example, vinyl aromatic monomers such as styrene. Specifically, there may be included polybutadiene, polychlorobutadiene such as neoprene; polyisobutylene and copolymers of isopbutylene with butadiene or isoprene; polyisoprene; copolymers of ethylene and propylene and copolymers of these with butadiene; thiocol rubber; polysulfurized rubber; acrylic rubber; polyurethane rubber; copolymers of diene such as butadiene and isoprene with various monomers such as alkyl unsaturated ester.

Also, these elastomers grafted with $\alpha,\beta$-unsaturated dicarboxylic acids such as maleic acid, monomethyl maleate, maleic anhydride, itaconic acid, monomethyl itaconate, itaconic anhydride and fumaric acid, or alicyclic carboxylic acids such as endo-bicyclo[2.2.1]-5-hepten-2,3-carboxylic acid and derivatives of these by utilizing peroxides, ionized radiation and UV-ray may be used.

When an impact resistance improving material (C) is further added to the intermediate composition (A) and the polyamide (B), they are formulated as described below.

That is, (A) is 10 to 70% by weight, preferably 12 to 65% by weight, particularly preferably 15 to 60% by weight, (B) is 20 to 70% by weight, preferably 22 to 67% by weight, particularly preferably 25 to 60% by weight, and (C) is 0 to 35% by weight, preferably 1 to 30% by weight, more preferably 2 to 25% by weight, particularly preferably 2 to 20% by weight.

In the resin composition of the present invention, if (A) is less than 10% by weight, heat-resistant rigidity is unsatisfactory, while if it exceeds 70% by weight, organic solvent resistance and low temperature high speed impact resistance are deficient. On the other hand, if (B) is less than 20% by weight, solvent resistance and low temperature high speed resistance are unsatisfactory, while if it exceeds 70% by weight, heat-resistant rigidity becomes unsatisfactory. Also, if (C) exceeds 35% by weight, rigidity becomes unsatisfactory.

Also, the resin composition can also contain an inorganic filler (D) added therein.

The inorganic filler (D) should preferably has an average particle size of 5 μm or less, preferably 4 μm or less, particularly preferably 2.5 μm or less. The average particle size as mentioned here is the average maximum particle size of primary particles measured by observation with an electron microscope. The shape of the inorganic filler (D) includes various shapes such as spherical, cubic, granular, needle, plate, fiber shapes, and any of them may be available. Among them, those shapes in plate or needle are preferred from balance of the physical properties of rigidity and impact resistance, and the improvement effect of dimensional stability.

As such inorganic filler, there are single substances, oxides, hydroxides, carbonates, sulfates, silicates, sulfites of metal elements of the groups I to VIII of the periodic table (e.g. Fe, Na, K, Cu, Mg, Ca, Zn, Ba, Al, Ti) or silicon atom, various clay minerals comprising these compounds, and others. Specifically, there can be included, for example, titanium oxide, zinc oxide, barium sulfate, silica, calcium carbonate, iron oxide, alumina, potassium titanate, aluminum hydroxide, magnesium hydroxide, calcium hydroxide, magnesium carbonate, calcium sulfate, sodium sulfate, calcium sulfite, calcium silicate, clay wallastonite, glass beads, glass powder, silica sand, silica, quartz powder, sand bar, diatomaceous earth, white carbon, iron powder and aluminum powder, and these may be also used in combination of plural kinds.

Among them, for being in shape of plates, talc, mica, kaolin, clay and diatomaceous earth with an average particle size of 5 μm or less are particularly preferred. For being in shape of needles, whisker of potassium titanate and wollastonite are preferred.

The inorganic filler (D) should be desirably added during kneading of the polyamide (B).

The content of the inorganic filler (D) may be preferably 3 to 50% by weight, more preferably 5 to 40% by weight, particularly preferably 8 to 35% by weight.

Also, in the resin composition of the present invention, in addition to the components as described above, optional components such as various stabilizers, lubricants, colorants, flowability controllers, nucleation agents and antifungal agents can be used as added at the stage of forming the final composition within the range which does not impair remarkably the effect of the present invention.

The resin composition of the present invention can be prepared by use of, for example, the various methods as described below.

(1) The method in which, after the intermediate composition (A) in shape of pellets or powder, the component (B), and optionally the component (C) and/or (D) are formed into a dispersed mixture by known means as described above, the mixture is melted and kneaded by use of a single or twin screw type extruder with $L/D = 10$ to 30 to prepare the final composition.

(2) The method in which to the intermediate composition (A) under molten state is added subsequently the component (B), and optionally the component (C) and/or (D), and the mixture is melted and kneaded by use of a single or twin screw extruder with $L/D = 10$ to 30 to prepare the final composition.

(3) The method in which, by use of a single or twin screw type extruder with $L/D = 30$ to 60, the components of the intermediate composition (A) are introduced in the state of the dispersed mixture before melting and kneading through the first hopper, and at the same time, the component (B) and optionally the component (C) and/or (D) is/are introduced through the intermediate hopper of the same extruder under molten state, and the whole is melted and kneaded to prepare the final composition.

(4) The method in which the components (B), (C) and/or (D) are melted and kneaded by a single or twin screw type extruder with $L/D = 10$ to 30, and the kneaded product and the intermediate composition (A) either in the form of pellets, powder obtained by crushing the pellets or molten state are simultaneously melted and kneaded by use of a single or twin screw type extruder with $L/D = 10$ to 30 to prepare the final composition.

In the above methods as described above, after the intermediate composition (A) and a part of the component (B), the component (C) and/or the component (D) are kneaded, the remainder of the components (B), (C) and/or (D) can be also added and kneaded.

In the above methods, the melting and kneading temperature is generally within the range from 200° to 350° C.

The resin composition thus obtained can be formed into pellets by extrusion after melting and kneading.

The resin composition of the present invention can be molded easily according to the molding method conventionally applied to thermoplastic resins, namely the injection molding method, the extrusion molding method and the blow molding method. Among them, it is preferred to mold the composition by use of the injection molding.

The resin composition of the present invention is suitable for uses such as internal and external decorative parts of automobiles, outer decorative parts of electrical instruments, and parts of office automation instruments, because of having good mechanical properties.

The present invention is described by referring to Examples, but the scope of the present invention is not limited by these Examples.

In Examples and Comparative examples, various physical property values and various properties were measured under the conditions described below.

(1) High speed impact test

On a test strip (120 mm × 80 mm, thickness 2 mm) placed on a supporting stand (hold diameter 2 inches) was thrown a dart (diameter ⅝ inch) which is the load sensor at a speed of 11 m/sec, the behavior of deformation or destruction of the test strip under the impact load was measured, and the impact energy absorbed to the crack generation point in the impact pattern obtained was calculated and defined as the impact strength of the material. Also, the broken state of the test strip destroyed was measured for 5 times, and ductile destructions for all of 5 times are shown by ◉, ductile destructions for 4 to 3 times by ○, ductile destructions for twice to once by △, and all fragile destructions by X.

The measurement was carried out at a temperature of $-20°$ C. and $-30°$ C.

(2) Izod impact strength

According to ISO R180-1969 (JIS K7110) (notched Izod impact strength), measurement was conducted by use of an Izod impact tester manufactured by Toyo Seiki Seisakusho.

The measurement was carried out at a temperature of $-20°$ C. and $-30°$ C.

(3) Flexural modulus

According to ISO R178-1974 Procedure 12 (JIS K7203), measurement was conducted by use of Instron tester.

The measurement temperature was 23° C.

(4) Surface luster

According to JIS D-8741, measurement was conducted by use of a luster meter of Nippon Denshoku Kogyo K.K.

(5) Linear expansion coefficient

According to ASTM D696, linear expansion coefficient was measured at a temperature range from 23° to 80° C.

EXAMPLES 1 to 3

Preparation of intermediate composition (A)

($A_1$) Polyphenylene ether resin

A poly(2,6-dimethyl-1,4-phenylene)ether having an inherent viscosity of 0.51 dl/g (at 30° C. in chloroform) was used.

($A_2$) Polyamide resin

An amorphous nylon (Novamid X21, trade name, manufactured by Mitsubishi Kasei Corporation, glass transition temperature 125° C., inherent viscosity according to JIS K6810:2.1 dl/g) was used.

($A_3$) Compound having unsaturated group and polar group in combination within the same molecule A commercially available maleic anhydride (reagent grade) was employed.

The components ($A_1$), ($A_2$) and optionally ($A_3$) as mentioned above were sufficiently mixed and stirred by a super mixer at formulation ratios shown in Table 1.

Next, the mixture was melted and kneaded by use of TEX twin screw extruder manufactured by Nippon Seiko K.K. (L/D=30) at a set temperature of 260° C. and a screw rotation number of 400 rpm to be formed into a composition, which was then extruded into a strand and cut into pellets. The pellets were dried at 105° C. in a hot air dryer for 8 hours. Thus, an intermediate composition (A - I) was obtained.

Preparation of resin composition (A) Intermediate composition

The intermediate composition (A - I) prepared as described above was used.

(B) Polyamide resin

Nylon 6 (Ultramid B-5, trade name, manufactured by Badische Aniline und Soda Aktiengesellshcaft (West Germany), injection molding grade) was used.

(C) Impact resistance improving material

A commercially available styrene-butadiene block copolymer (KX-65, trade name, manufactured by Nippon Synthetic Rubber K.K., styrene content; 28% by weight) (SBS), a commercially available ethylene-propylene rubber modified with maleic anhydride (T7741P, trade name, manufactured by Nippon Synthetic Rubber K.K., maleic anhydride content; 0.5 to 1% by weight) (M-EPR) and a commercially available hydrogenated styrene-butadiene block copolymer (Kraton G1651, trade name, manufactured by Shell, styrene content; 33% by weight) (SEBS) were used.

The above respective components were sufficiently mixed and stirred by a super mixer at the formulation ratios shown in Table 2. Subsequently, the mixture was melted and kneaded by use of TEX twin screw type extruder manufactured by Nippon Seiko K.K. at a set temperature of 240° C. and a screw rotation number of 440 rpm to be formed into a composition, followed by pelletizing.

Preparation of test strip for physical properties and evaluation

From the pellets of the above resin composition, by use of an inline screw system injection molding machine (IS-90B trade name, Model manufactured by Toshiba Kikai Seisakusho), injection molding was performed at a cylinder temperature of 280° C. and a mold cooling temperature of 70° C. to prepare a test strip.

In carrying out injection molding, the pellets were dried to immediately therebefore under the conditions of 0.1 mmHg and 80° C. for 48 hours. Also, the test strip injection molded was placed in a desiccator, left stand at 23° C. for 4 days to 6 days and then evaluated as shown in Table 2.

EXAMPLES 4 and 5

By use of the polyphenylene ether ($A_1$), the polyamide ($A_2$), and the compound ($A_3$) having an unsaturated group and a polar group within the same molecule used in Examples 1 to 3, and by use of the elastomer used as the impact resistance improver (C) in Examples 1 to 3 as the impact resistance improving material ($A_4$), intermediate compositions (A - II) and (A - III) with the formulation ratios shown in Table 1 were obtained similarly as in Examples 1 to 3.

Preparation of resin composition

By use of the intermediate compositions (A - II) and (A - III) prepared as described above, test strips were molded according to the same method as described in Examples 1-3 and evaluated.

The results are as shown in Table 2.

COMPARATIVE EXAMPLES 1 to 5

After the components were sufficiently mixed and stirred by a super mixer at formulation ratios shown in Table 2, the mixture was melted and kneaded by use of TEX (trade name) twin screw type extruder (L/D=30) manufactured by Nippon Seiko K.K. at a set temperature of 240° C. and a screw rotation number of 440 rpm to be formed into a composition, followed by pelletizing.

However, as the respective components, those shown below were employed.

Polyphenylene ether resin

The polyphenylene ether resin used as the component $(A_1)$ of the intermediate composition (A) in Examples 1 to 3 was employed.

Polyamide resin

Nylon 6 used as the component (B) of the final resin composition in Examples 1 to 3 was employed.

Impact resistance improving material

Either the commercially available styrene-butadiene block copolymer (KX 65, trade name), the commercially available ethylene-propylene rubber modified with maleic anhydride (T7741P, trade name) or the commercially available hydrogenated styrene-butadiene block copolymer (Kraton G1651, trade name) used as the composition (C) of the final resin composition in Examples 1 to 3 was employed.

Maleic anhydride

A commercially available maleic anhydride (reagent grade) was employed.

COMPARATIVE EXAMPLES 6 and 7

Preparation of intermediate composition (A)

The same respective components $(A_1)$, $(A_2)$ and $(A_3)$ as in Examples 1 to 3 were used at the formulation ratios shown in Table 1, and the intermediate compositions (A - IV) and (A - V) were prepared.

Preparation of resin composition (A) Intermediate composition

The intermediate composition (A - IV) or (A - V) prepared as described above was used.

(B) Polyamide resin

The same polyamide as in Examples 1 to 3 was used.

(C) Impact resistance improving material

No impact resistance improving material was used.

The above components were mixed, melted and kneaded at the formulation ratios shown in Table 2 in the same manner as in Examples 1 to 3, followed by pelletizing, to prepare pellets of the resin composition.

Preparation of test strip for physical properties and evaluation

Test strips were prepared similarly as in Examples 1 to 3 and evaluated as shown in Table 2.

TABLE 1

| Intermediate composition | | A-I | A-II | A-III | A-IV | A-V |
|---|---|---|---|---|---|---|
| Formulation weight ratio | Polyphenylene ether resin $(A_1)$ | 92 | 73 | 82 | 98 | 68 |
| | Polyamide resin $(A_2)$ | 6 | 5 | 5 | 0 | 30 |
| | Compound $(A_3)$ having unsaturated group and polar group in combination in the same molecule | 2 | 2 | 2 | 2 | 2 |
| | Impact resistance improving material $(A_4)$ | | | | | |
| | M-EPR | — | 10 | 11 | — | — |
| | SEBS | — | 10 | — | — | — |
| | SBS | — | — | — | — | — |

TABLE 2

| | Examples | | | | | Comparative examples | | | | | | |
|---|---|---|---|---|---|---|---|---|---|---|---|---|
| | 1 | 2 | 3 | 4 | 5 | 1 | 2 | 3 | 4 | 5 | 6 | 7 |
| | Formulation weight ratio | | | | | | | | | | | |
| (A) Intermediate composition | A-I | A-I | A-I | A-II | A-III | — | — | — | — | — | A-IV | A-V |
| | 44 | 42 | 44 | 54 | 49 | | | | | | 41 | 59 |
| Polyphenylene ether resin | 0 | 0 | 0 | 0 | 0 | 40 | 38 | 36 | 40 | 40 | 0 | 0 |
| (B) Polyamide resin nylon 6 | 46 | 43 | 46 | 46 | 46 | 49 | 46 | 44 | 49 | 49 | 49 | 31 |
| (C) Impact resistance improving material | | | | | | | | | | | | |
| SBS (KX65) | 5 | 8 | — | — | — | 5 | 8 | 10 | — | — | 5 | 5 |
| M-EPR (T7741P) | 5 | 8 | 10 | — | — | 5 | 8 | 10 | 10 | 5 | 5 | 5 |
| SEBS (G1651) | — | — | — | — | 5 | — | — | — | — | 5 | — | — |
| Maleic anhydride | 0 | 0 | 0 | 0 | 0 | 1 | 1 | 1 | 1 | 0 | 0 | 0 |
| | Evaluation | | | | | | | | | | | |
| Flexural modulus 23° C. (kg/cm$^2$) | 19900 | 18300 | 19800 | 19300 | 20100 | 20300 | 18500 | 15800 | 19000 | 19500 | 20000 | 20800 |
| Izod impact strength 20° C. (kg · cm/cm) | 26.6 | NB 50.1 | 18.0 | 25.5 | NB 38.3 | 18.8 | NB 44.0 | NB 56.4 | 14.7 | 17.2 | 16.8 | 12.8 |

TABLE 2-continued

|  | Examples | | | | | Comparative examples | | | | | | |
|---|---|---|---|---|---|---|---|---|---|---|---|---|
|  | 1 | 2 | 3 | 4 | 5 | 1 | 2 | 3 | 4 | 5 | 6 | 7 |
| 30° C. (kg · cm/cm) | 18.0 | 33.0 | 14.0 | 19.8 | 20.7 | 14.8 | 24.4 | NB 45.1 | 10.0 | 13.8 | 11.0 | 10.0 |
| High speed impact strength | | | | | | | | | | | | |
| 20° C. (kg · cm) | ●365 | ●433 | ●487 | ●481 | ●449 | X 250 | ○333 | ●365 | X 255 | X 276 | X 180 | X 276 |
| 30° C. (kg · cm) | ●360 | ●314 | ○342 | ○287 | ●409 | X 200 | X 240 | ○344 | X 210 | X 284 | X 171 | X 231 |
| Luster (%) | 75 | 80 | 66 | 45 | 81 | 40 | 36 | 30 | 50 | 48 | 89 | 61 |
| Linear expansion coefficient (°C.$^{-1}$) $\times 10^{-5}$ | 10.1 | 11.2 | 10.0 | 10.0 | 10.1 | 10.2 | 11.3 | 12.6 | 10.0 | 10.2 | 10.0 | 10.6 |

SBS: styrene-butadiene block copolymer,
SEBS: hydrogenated styrene-butadiene block copolymer,
M-FPR: ethylene-propylene rubber modified with maleic anyhdride As described in detail above, the resin composition of the present invention, which uses an intermediate composition comprising a polyphenylene ether resin previously formed, has high impact strength at low temperature, and also because the broken state in high speed impact strength has become ductile destruction from fragile destruction, it can be understood that high speed impact strength is remarkably improved and also appearance and luster are excellent.

Therefore, the resin composition of the present invention is a resin composition improved in high speed impact resistance at low temperature and rigidity with good balance and also good in appearance and luster, and it can be an industrially advantageous material useful for wide uses.

We claim:

1. A resin composition comprising:
   (A) 10 to 70% by weight of an intermediate composition obtained by melting and kneading:
      ($A_1$) 75 to 99% by weight of a polyphenylene ether resin;
      ($A_2$) 0.1 to 19.9% by weight of a polyamide resin;
      ($A_3$) 0.01 to 10% by weight of a compound having an unsaturated group and a polar group in the same molecule in combination, and
      ($A_4$) 0 to 20% by weight of an impact resistance improving material,
   (B) 30 to 90% by weight of a polyamide resin, and
   (C) 0 to 35% by weight of an impact resistance improving material kneaded therein.

2. The resin composition according to claim 1, wherein the compound ($A_3$) having an unsaturated group and a polar group within the same molecule is at least one selected from unsaturated carboxylic acids, unsaturated esters, unsaturated acid anhydrides, unsaturated amines, unsaturated amides, unsaturated epoxy compounds, unsaturated alcohols and unsaturated isocyanic acid esters.

3. The resin composition according to claim 1, wherein the compound ($A_3$) having an unsaturated group and a polar group in the same molecule is at least one selected from maleic anhydride, maleic acid, itaconic anhydride and itaconic acid.

4. A resin composition comprising:
   (A) 10 to 70% by weight of an intermediate composition obtained by melting and kneading:
      ($A_1$) 75 to 99% by weight of a polyphenylene ether resin;
      ($A_2$) 0.1 to 19.9% by weight of a polyamide resin;
      ($A_3$) 0.01 to 10% by weight of a compound having an unsaturated group and a polar group in the same molecule in combination; and
      ($A_4$) 1 to 18% by weight of an impact resistance improving material,
   (B) 20 to 70% by weight of a polyamide resin, and
   (C) 1 to 30% by weight of an impact resistance improving material kneaded therein.

5. The resin composition according to claim 4, wherein the impact resistance improving materials ($A_4$) and (C) are elastomers having a tensile modulus of 5000 Kg/cm$^2$ or less.

6. The resin composition according to claim 4, wherein the compound ($A_3$) having an unsaturated group and a polar group within the same molecule is at least one selected from unsaturated carboxylic acids, unsaturated esters, unsaturated acid anhydrides, unsaturated amines, unsaturated amides, unsaturated epoxy compounds, unsaturated alcohols and unsaturated isocyanic acid esters.

7. The resin composition according to claim 4, wherein the compound ($A_3$) having an unsaturated group and a polar group in the same molecule is at least one selected from maleic anhydride, maleic acid, itaconic anhyride and itaconic acid.

8. A resin composition according to claim 4 wherein component $A_4$ is present in an amount of 2-15% by weight.

* * * * *